(12) United States Patent
Kim et al.

(10) Patent No.: US 11,311,858 B2
(45) Date of Patent: Apr. 26, 2022

(54) CATALYST FOR REMOVING NITROGEN OXIDES

(71) Applicants: HYUNDAI MOTOR COMPANY, Seoul (KR); KIA MOTORS CORPORATION, Seoul (KR); KOREA ADVANCED INSTITUTE OF SCIENCE AND TECHNOLOGY, Daejeon (KR)

(72) Inventors: Pyung Soon Kim, Suwon-si (KR); Chang Hwan Kim, Seongnam-si (KR); Hyunjoo Lee, Daejeon (KR); Beom-Sik Kim, Daejeon (KR); Hojin Jeong, Daejeon (KR); Junemin Bae, Daejeon (KR)

(73) Assignees: HYUNDAI MOTOR COMPANY, Seoul (KR); KIA MOTORS CORPORATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 85 days.

(21) Appl. No.: 16/856,451

(22) Filed: Apr. 23, 2020

(65) Prior Publication Data
US 2021/0113995 A1 Apr. 22, 2021

(30) Foreign Application Priority Data
Oct. 22, 2019 (KR) .................. 10-2019-0131145

(51) Int. Cl.
*B01J 21/04* (2006.01)
*B01J 23/02* (2006.01)
*B01J 23/10* (2006.01)
*B01J 23/42* (2006.01)
*B01J 23/58* (2006.01)
(Continued)

(52) U.S. Cl.
CPC ............ *B01J 23/42* (2013.01); *F01N 3/0842* (2013.01); *B01J 21/04* (2013.01)

(58) Field of Classification Search
CPC ... B01J 23/02; B01J 23/10; B01J 23/42; B01J 23/58; B01J 23/63; B01J 21/04; F01N 3/0842
See application file for complete search history.

(56) References Cited

U.S. PATENT DOCUMENTS 4,492,770 A * 1/1985 Blanchard ............ B01D 53/945
502/304
6,139,808 A * 10/2000 Mizuno ................ B01D 53/945
422/180
(Continued)

FOREIGN PATENT DOCUMENTS

JP H07-213902 A 8/1995
KR 10-2008-0097700 A 11/2008
(Continued)

*Primary Examiner* — Cam N. Nguyen
(74) *Attorney, Agent, or Firm* — Morgan, Lewis & Bockius LLP

(57) ABSTRACT

A catalyst for removing nitrogen oxides, and the catalyst for removing the nitrogen oxides includes a first catalyst having a component including Pt, Ba, and Ce supported on a first support, and a second catalyst physically mixed with the first catalyst and having a component including Cu and Ce supported on a second support.

8 Claims, 13 Drawing Sheets

(51) Int. Cl.
*B01J 23/63* (2006.01)
*F01N 3/08* (2006.01)

(56) References Cited

U.S. PATENT DOCUMENTS

| | | | |
|---|---|---|---|
| 7,923,407 B2 * | 4/2011 | Goto | B01D 53/945 |
| | | | 502/327 |
| 7,939,041 B2 | 5/2011 | Darab | |
| 10,252,217 B2 * | 4/2019 | Zhang | B01J 21/04 |
| 10,328,388 B2 * | 6/2019 | Dumbuya | B01J 37/0246 |
| 10,857,521 B2 * | 12/2020 | Sung | B01J 37/0236 |
| 2012/0003132 A1 * | 1/2012 | Wang | B01J 23/002 |
| | | | 423/219 |
| 2015/0037233 A1 * | 2/2015 | Fedeyko | B01J 37/0244 |
| | | | 423/239.1 |

FOREIGN PATENT DOCUMENTS

| | | |
|---|---|---|
| KR | 10-2009-0086517 A | 8/2009 |
| KR | 10-2010-0061152 A | 6/2010 |
| WO | 2017/017258 A1 | 2/2017 |

\* cited by examiner

CATALYST FOR REMOVING NITROGEN OXIDES

CROSS-REFERENCE TO RELATED APPLICATION

This application claims priority to and the benefit of Korean Patent Application No. 10-2019-0131145 filed in the Korean Intellectual Property Office on Oct. 22, 2019, the entire contents of which are incorporated herein by reference.

BACKGROUND OF THE DISCLOSURE

(a) Field of the Disclosure

The present embodiments relate to a catalyst for removing nitrogen oxides, and more particularly, to a catalyst for removing nitrogen oxides that improves purification performance of nitrogen oxides at a low temperature before and after hydrothermal aging.

(b) Description of the Related Art

Generally, exhaust gas of a diesel vehicle includes carbon monoxide, hydrocarbons, and nitrogen oxides, which are hazardous substances. Among these, the carbon monoxide and the hydrocarbons cause relatively few problems, but nitrogen oxides cause environmental problems such as photochemical smog, acid rain, and human disease. Therefore, there is a demand for developing an exhaust gas post-treatment technology along with an improvement of an engine.

A storage type of lean $NO_x$ trap (LNT) catalyst is a catalyst that suppresses emission of nitrogen oxides ($NO_x$) by storing (or absorbing) $NO_x$ as nitrates in a lean burn region in which $NO_x$ reduction by a noble metal reaction is difficult due to a high oxygen concentration in exhaust gas compared to a theoretical air-fuel ratio at which fuel and air can be completely burned. When the $NO_x$ storage process proceeds for a predetermined time, a limit of $NO_x$ storage capacity of the catalyst is reached, and in this case, when the oxygen concentration in the exhaust gas is lowered through engine combustion control (post injection) and a reduction component such as CO/HC is increased, the stored nitrates react with a reduction agent (for example, HC, CO, $H_2$, etc.) to be reduced to nitrogen ($N_2$).

Reaction in a $NO_x$ storage period: 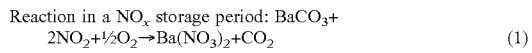 (1)

Reaction in a $NO_x$ reduction period: 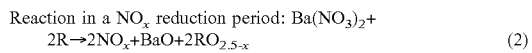 (2)

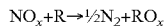

(In Reaction Equation (2), R represents a reduction agent.)

The storage Lean $NO_x$ Trap (LNT) catalyst represents $NO_x$ storage performance in a 100-400° C. temperature range, and represents $NO_x$ reduction performance at 250° C. or more. However, in the LNT catalyst for a diesel engine, since the $NO_x$ storage is performed at a lower temperature than the temperature range, as the $NO_x$ storage material, cerium (Ce) is used in addition to barium (Ba). Cerium (Ce) has a merit that it has excellent low temperature storage performance compared to barium (Ba), however, its storage strength is weaker than that of Ba, so it is a main cause of a thermal desorption phenomenon in which it does not hold more, but exhausts the stored $NO_x$ in case of a rapid increase of the catalyst temperature due to vehicle acceleration, which is a main cause of deterioration of the $NO_x$ purification performance.

The LNT catalyst was proposed by Toyota for vehicles in the early 1990s, and was developed for lean burn gasoline catalysts. A separate three-way catalyst is disposed at the front of the LNT catalyst. Due to characteristics of the gasoline engine, the catalytic reaction temperature is higher than that of a passenger diesel engine. Therefore, a catalyst including Ba, K, etc. as a high temperature storage material with a high content of 10 to 20 wt % was developed, and thereafter, a catalyst additionally including a Ce component for the low temperature storage was developed.

Alumina is mainly used as an LNT catalyst support. Patent Document 1 discloses a $NO_x$ storage catalyst in which a metal such as platinum, palladium, and cobalt and the barium $NO_x$ storage material are simultaneously supported on a porous alumina support. In addition, Patent Document 2 discloses a $NO_x$ storage catalyst in which the catalyst is composed of a diesel fuel decomposition catalyst, a nitrogen oxide storage layer, and a nitrogen reduction layer, barium (Ba) is coated on the alumina support in the nitrogen oxide storage layer, and platinum (Pt) is supported on a mixture support of alumina-ceria ($Al_2O_3$—$CeO_2$) in the nitrogen reduction layer. However, when barium (Ba) is supported on the alumina support, barium and alumina react such that $BaAl_2O_4$ is formed, and this may deteriorate the $NO_x$ storage performance of Ba. To solve this problem, a technique of using alumina ($MgAl_2O_4$) having a spinel structure substituted with magnesium (Mg) as the support has been developed. Furthermore, Patent Document 3 discloses a $NO_x$ storage catalyst in which barium (Ba) and a noble metal are supported on a mixture support of alumina and ceria.

Recently, with an announcement of EURO VI exhaust regulations, most passenger diesel vehicles will be equipped with the $NO_x$ abatement catalyst. Since the amount of the exhaust-permitted $NO_x$ in EURO VI is halved compared to EURO V, the catalyst improvement of the $NO_x$ reduction catalyst is more urgently required.

PATENT DOCUMENT

Patent Document 1: Korean Patent Application Publication KR 2009-0086517

Patent Document 2: Korean Patent Application Publication KR 2010-0061152

Patent Document 3: Japanese Patent Application Publication JP 1995-213902

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a catalyst for removing high heat-resistant nitrogen oxides and that improves purification performance of nitrogen oxides at a low temperature before and after hydrothermal aging.

An embodiment of the present disclosure provides a catalyst for removing nitrogen oxides, including: a first catalyst having a component including Pt, Ba, and Ce supported on a first support; and a second catalyst physically mixed with the first catalyst and having a component including Cu and Ce supported on a second support.

The catalyst for removing nitrogen oxides according to the embodiment is a physical mixture of the first catalyst and the second catalyst, and thus, it has excellent nitrogen oxide performance at a low temperature before and after hydrothermal aging. Accordingly, it is possible to provide a catalyst for removing nitrogen oxides with significantly improved heat-resistance.

DETAILED DESCRIPTION OF THE EMBODIMENTS

Figure 1:
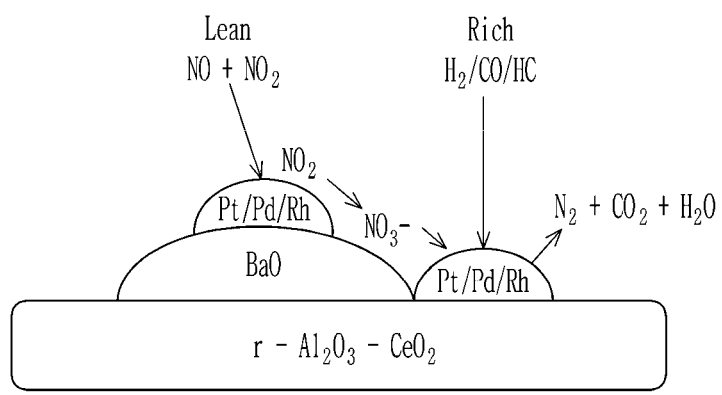
FIG. 1 illustrates a principle of removing nitrogen oxides by a typical LNT catalyst.

Advantages and features of the present disclosure and methods of accomplishing the same may be understood more readily by reference to the following detailed description of preferred embodiments and the accompanying drawings. However, the present disclosure is not limited to the exemplary embodiments described hereinafter, and may be embodied in many different forms. The following exemplary embodiments are provided to make the disclosure of the present disclosure complete and to allow those skilled in the art to clearly understand the scope of the present disclosure, and the present disclosure is defined only by the scope of the appended claims. Throughout the specification, the same reference numerals denote the same constituent elements.

When referring to a part as being "on" or "above" another part, it may be positioned directly on or above another part, or another part may be interposed therebetween. In contrast, when referring to a part being "directly above" another part, no other part is interposed therebetween.

In some exemplary embodiments, detailed description of well-known technologies will be omitted to prevent the disclosure of the present disclosure from being interpreted ambiguously. Unless otherwise defined, all terms (including technical and scientific terms) used herein have the same meaning as commonly understood by one of ordinary skill in the art. In the present specification, unless explicitly described to the contrary, the word "comprise" and variations such as "comprises" or "comprising" will be understood to imply the inclusion of stated elements but not the exclusion of any other elements. Further, as used herein, the singular forms "a", "an", and "the" are intended to include the plural forms as well, unless the context clearly indicates otherwise.

Hereinafter, a catalyst for removing nitrogen oxides according to an embodiment of the present disclosure will be described in detail with reference to the accompanying drawings.

FIG. 1 illustrates a principle of removing nitrogen oxides by a general LNT catalyst (lean $NO_x$ trap catalyst, nitrogen oxide removal catalyst).

The LNT catalyst is mainly used in a diesel engine vehicle as a $NO_x$ removal catalyst through lean/rich control. In the typical LNT catalyst, NO is oxidized into $NO_2$ in a lean atmosphere on a noble metal catalyst and stored to a Ba site. Then, the $NO_x$ stored in a rich atmosphere is reduced to $N_2$ by the reaction with reduction agent gases of $H_2$, CO, and HC.

However, in a case of a current commercial LNT, $NO_x$ purification performance appears in the temperature range of 250-350° C. Further, according to introduction of a real driving emission (RDE), the $NO_x$ purification performance requires introduction of an excellent LNT catalyst at the low temperature range, such as 150-200° C.

To improve the $NO_x$ purification performance at the low temperature, it is necessary to improve both the $NO_x$ storage amount and reduction efficiency at the low temperature. Therefore, it is necessary to improve the purification performance by adding a functional material for improving the low temperature $NO_x$ storage and the reduction to the existing LNT catalyst. In addition, in order to apply it to a diesel vehicle, a high heat-resistance catalyst having excellent low temperature $NO_x$ purification performance after hydrothermal aging is required.

Therefore, in an embodiment of the present disclosure, the existing LNT catalyst component and the non-noble metal catalyst component are respectively supported on a reduced alumina support and then physically mixed and applied, thus a catalyst having high heat-resistance and excellent nitrogen oxide purification performance at a low temperature is provided.

That is, the catalyst for removing nitrogen oxides according to the embodiment includes a first catalyst in which a component including Pt, Ba, and Ce is supported on a first support, and a second catalyst that is physically mixed with the first catalyst and in which a component including Cu and Ce is supported on a second support.

In the present embodiment, the first support and the second support are reduced alumina supports, and more specifically, the reduced alumina support is, for example, $\gamma$-$Al_2O_3$.

Figure 2A:
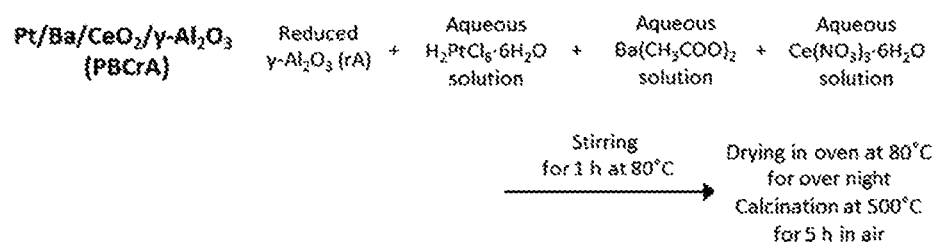
FIG. 2A illustrates a method of synthesizing a first catalyst included in an embodiment.
Figure 2B:
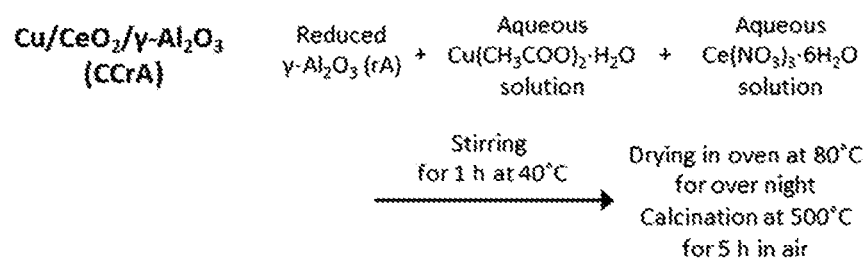
FIG. 2B illustrates a method of synthesizing a second catalyst.

FIG. 2A and FIG. 2B illustrate a method of synthesizing $Cu/CeO_2$ according to one embodiment of the present disclosure. Referring to FIG. 2A and FIG. 2B, the $Cu/CeO_2$ catalyst according to the present disclosure is prepared by impregnating Cu to a $CeO_2$ support, and the catalyst is dried at 110° C. for 5 hours or more and then calcined for 5 hours while increasing the temperature to 500° C. at 5° C./min speed in a calcining furnace.

FIG. 2A illustrates a method of synthesizing a first catalyst included in one embodiment of the present disclosure, and FIG. 2B illustrates a method of synthesizing a second catalyst as one embodiment of the present disclosure.

Referring to FIG. 2A, the first catalyst is prepared by impregnating a $H_2PtCl_6 \cdot 6H_2O$ solution, a $Ba(CH_3COO)_2$ solution, and a $Ce(NO_3)_3 \cdot 6H_2O$ solution to the reduced $\gamma\text{-}Al_2O_3$ support, then drying it at 80° C. for about a period of time (e.g., about overnight), and then calcining it for 5 hours while increasing the temperature to 500° C. in a calcining furnace.

Referring to FIG. 2B, the second catalyst is prepared by impregnating a $Cu(CH_3COO)_2 \cdot H_2O$ solution and a $Ce(NO_3)_3 \cdot 6H_2O$ to the reduced $\gamma\text{-}Al_2O_3$ support, then drying it at 80° C. for about a period of time (e.g., about overnight), and then calcining it for 5 hours while increasing the temperature to 500° C. in a calcining furnace.

In the present embodiment, the first catalyst and the second catalyst are prepared by using the $\gamma\text{-}Al_2O_3$ support reduced to both the first and second supports.

Figure 3A:
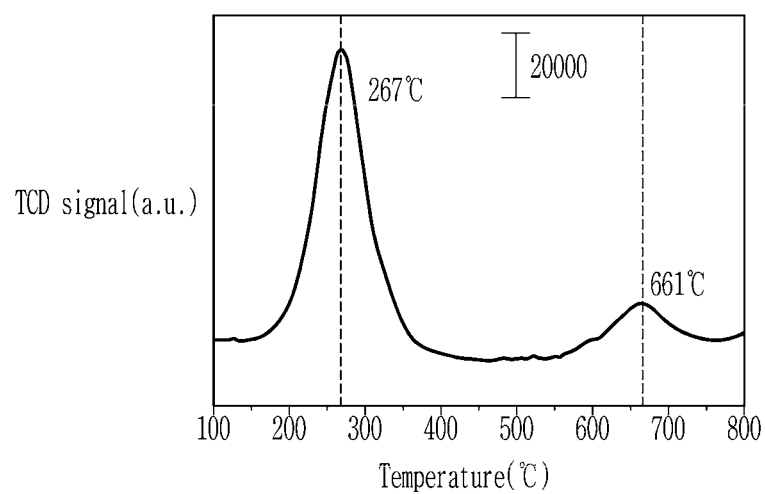
FIG. 3A illustrates a result of measuring temperature programmed reduction (TPR) for surface $Al^{3+}$ and bulk $Al^{3+}$.
Figure 3B:
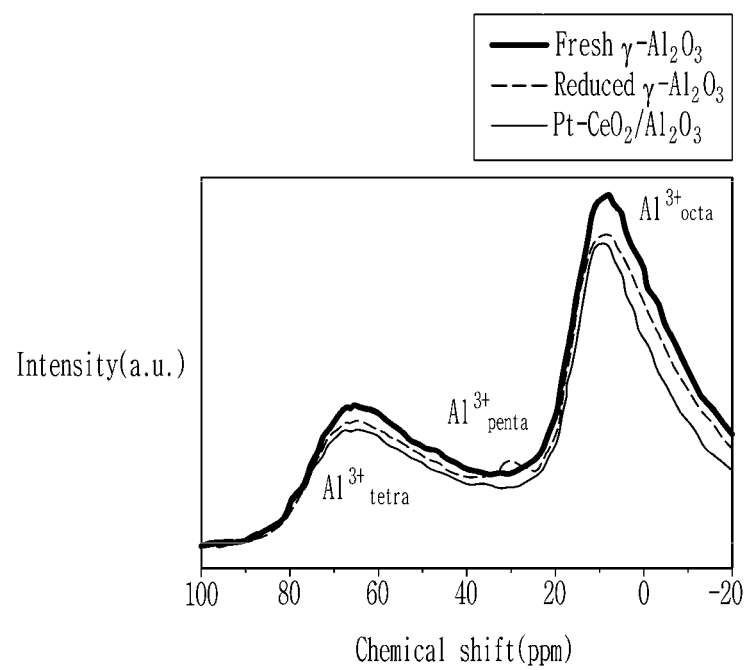
FIG. 3B illustrates $^{27}Al$ MAS NMR measurement results for $\gamma$-$Al_2O_3$.

FIG. 3A and FIG. 3B illustrate a method of preparing the reduced $\gamma\text{-}Al_2O_3$.

FIG. 3A illustrates a result of measuring temperature programmed reduction (TPR) for surface $Al^{3+}$ and bulk $Al^{3+}$. Referring to FIG. 3A, reduction peaks were confirmed at 267° C. and 661° C. for the surface $Al^{3+}$ and the bulk $Al^{3+}$, respectively. Through the above result, in order to obtain the reduced alumina support for use as the first support and the second support of the present embodiment, it can be seen that the surface $Al^{3+}$ is needed. Thus, the reduced $\gamma\text{-}Al_2O_3$ support was prepared by reducing the $\gamma\text{-}Al_2O_3$ at 350° C. for 1 hour while flowing 10% $H^2$ and $N^2$ gas.

FIG. 3B illustrates $^{27}Al$ MAS NMR measurement results for $\gamma\text{-}Al_2O_3$ to which fresh $\gamma\text{-}Al_2O_3$, reduced $\gamma\text{-}Al_2O_3$, and $Pt\text{—}CeO_2$ are impregnated. FIG. 3B show that an $Al^{3+}_{penta}$ site is generated when being reduced with hydrogen, and when $Pt\text{—}CeO_2$ is impregnated to $\gamma\text{-}Al_2O_3$ in which the $Al^{3+}_{penta}$ site is generated, it can be seen that the $Al^{3+}_{penta}$ site disappears. The results of FIG. 3B shows that $Pt\text{—}CeO_2$ is fixed at a penta site when a catalyst component is impregnated. Therefore, even with hydrothermal aging, it can be seen that $Pt\text{—}CeO_2$ can easily move and not lump together.

Therefore, in the present embodiment, the first and second supports included in the first and second catalysts may be the reduced $\gamma\text{-}Al_2O_3$.

The $NO_x$ purification performance was evaluated by mixing the first and second catalysts prepared in the above manner.

Figure 4:
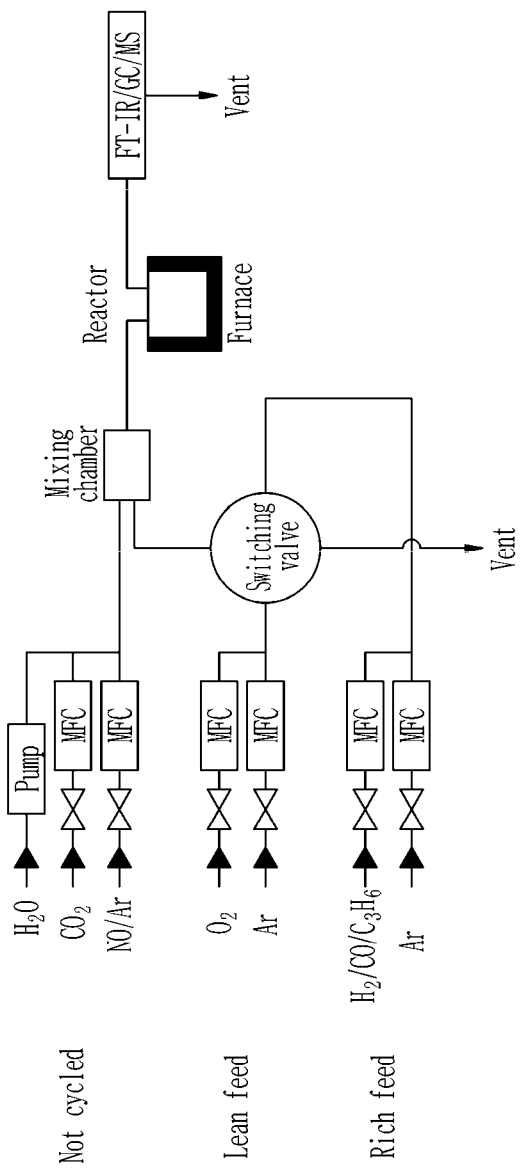
FIG. 4 illustrates a structure of a reaction device used for a catalyst evaluation of an embodiment.

The $NO_x$ purification performance was evaluated using the reaction device shown in FIG. 4 under the experimental conditions as shown in Table 1 below.

TABLE 1

|  | Lean | Rich |
| --- | --- | --- |
| Duration (min) | 12 | 2 |
| Space velocity (mL $g_{cat}^{-1}$ $h^{-1}$) | 120,000 | 120,000 |
| NO (ppm) | 200 | 200 |
| $O_2$ (%) | 8 | — |
| CO (%) | — | 2 |
| $H_2O$ | 5 | 5 |
| Ar | Balance | Balance |

That is, in the evaluation of the catalyst for removing nitrogen oxides according to the present embodiment, after performing pretreatment at 500° C. for 1 hour while flowing 1% $H_2/Ar$ gas after filling 0.1 g of powder catalyst in a quartz reaction tube under the conditions as shown in Table 1, the $NO_x$ purification performance was evaluated.

Next, after hydrothermal aging for 25 hours at 10% $H_2$/air and 750° C., the $NO_x$ purification performance was evaluated.

For effect comparison, as Comparative Example 1, a $Pt/Ba/CeO_2$ catalyst was prepared, and as Comparative Example 2, a catalyst in which $Pt/Ba/CeO_2$ and $Cu/CeO_2$ were physically mixed at a weight ratio of 1:1 was prepared. In addition, a catalyst of Example 1 in which $Pt/Ba/CeO_2/\gamma\text{-}Al_2O_3$ as the first catalyst and $Cu/CeO_2/\gamma\text{-}Al_2O_3$ as the second catalyst were physically mixed at a weight ratio of 1:1 was prepared.

Figure 5:
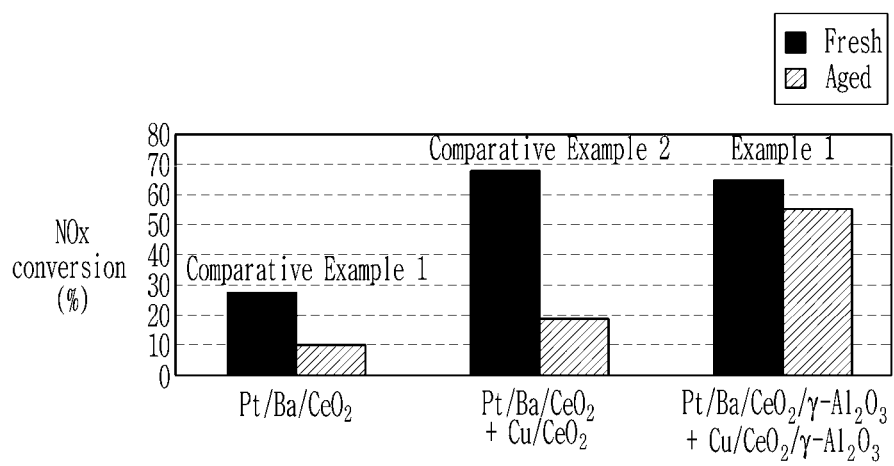
FIG. 5 illustrates a nitrogen oxide conversion rate at 200° C. before and after hydrothermal aging for Comparative Example 1, Comparative Example 2, and Example 1.

FIG. 5 illustrates a nitrogen oxide conversion rate at 200° C. before and after hydrothermal aging for Comparative Example 1, Comparative Example 2, and Example 1.

Referring to FIG. 5, it can be confirmed that in the case of Comparative Example 1, the nitrogen oxide conversion rate before and after hydrothermal aging is very low at 200° C., and in Comparative Example 2, the nitrogen oxide conversion rate before the hydrothermal aging is very high at 200° C., while the nitrogen oxide conversion rate after the hydrothermal aging is significantly lowered.

In contrast, it can be confirmed that in the case of Example 1, the nitrogen oxide conversion rate even before the hydrothermal aging is very high at 200° C., while the nitrogen oxide conversion rate even after hydrothermal aging for 25 hours at 750° C. is very high.

A mixing weight ratio of the first catalyst and the second catalyst may range from 1:3 to 3:1, and more specifically, from 1:2 to 2:1.

Figure 6:
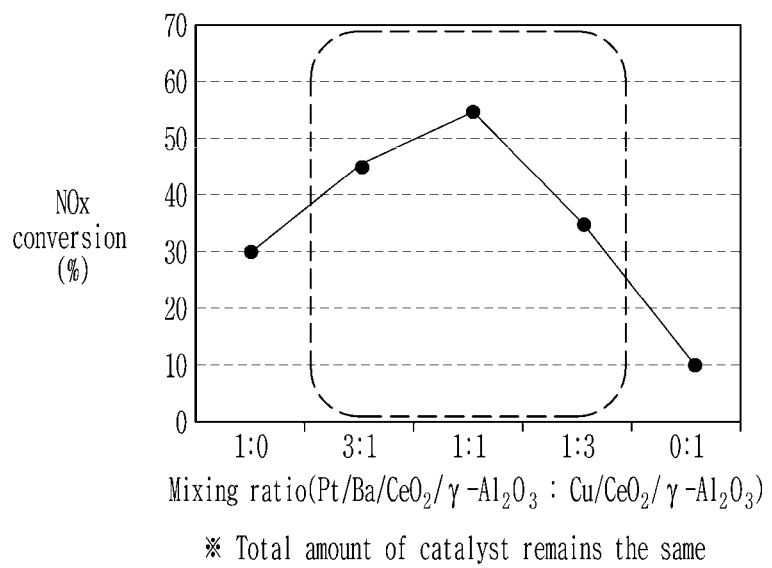
FIG. 6 illustrates a nitrogen oxide conversion rate measured according to a mixing weight ratio of first and second catalysts.

FIG. 6 illustrates results of measuring the nitrogen oxide conversion rate while varying the mixing weight ratio of the first and second catalysts.

Referring to FIG. 6, it can be seen that when the mixing weight ratio of the first and second catalysts is in a range of 1:3 to 3:1, the nitrogen oxide conversion rate at a low temperature is improved, and more specifically, the best performance is obtained in a range of 1:2 to 2:1, particularly, in a range of 1:1.

Meanwhile, a content of Cu in the second catalyst may be 1 wt % to 8 wt %, more specifically 1 wt % to 6 wt %, with respect to 100 wt % of the second support.

In the second catalyst, a content of a component including Ce may be 15 wt % to 30 wt %, more specifically 15 to 25 wt %, with respect to 100 wt % of the second support.

In addition, a content of Pt in the first catalyst may be 0.1 wt % to 5 wt %, more specifically 0.5 wt % to 3 wt %, with respect to 100 wt % of the first support.

A content of Ba in the first catalyst may be 5 wt % to 15 wt %, more specifically 7 wt % to 12 wt %, with respect to 100 wt % of the first support.

In the first catalyst, a content of a component including Ce may be 15 wt % to 30 wt %, more specifically 15 to 25 wt %, with respect to 100 wt % of the first support.

Figure 7A:
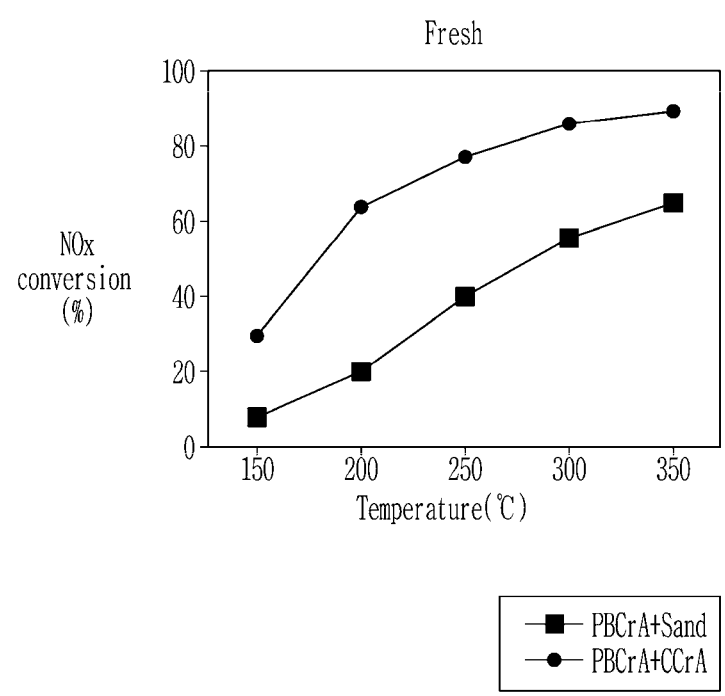
FIG. 7A and FIG. 7B illustrate nitrogen oxide conversion rates with respect to temperatures before and after hydrothermal aging for catalysts prepared according to Example 1 and Comparative Example 1.
Figure 7B:
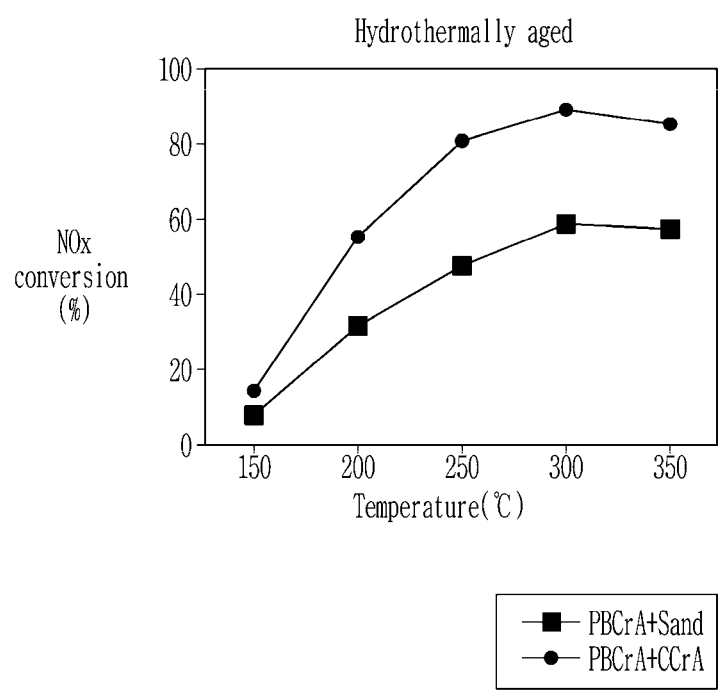

FIG. 7A and FIG. 7B illustrate nitrogen oxide conversion rates with respect to temperatures before and after hydrothermal aging for catalysts prepared according to Example 1 and Comparative Example 1.

Example 1 is a case in which 1 wt % Pt/10 wt % Ba/20 wt % $CeO_2/\gamma\text{-}Al_2O_3$ (PBCrA)+5 wt % Cu/20 wt % $CeO_2/\gamma\text{-}Al_2O_3$ (CCrA) are mixed at a weight ratio of 1:1, and Comparative Example 1 is a case in which PBCrA is used alone (PBCrA+Sand). In Example 1 and Comparative Example 1, total amounts of noble metals remained the same.

Referring to FIG. 7A and FIG. 7B, in the case of Example 1, it can be seen that the nitrogen oxide conversion rate is excellent before hydrothermal aging as well as after hydrothermal aging in a temperature range of, e.g., 150 to 350° C. However, in the case of Comparative Example 1, it can be seen that the nitrogen oxide conversion rate is low both before and after hydrothermal aging.

Figure 8:
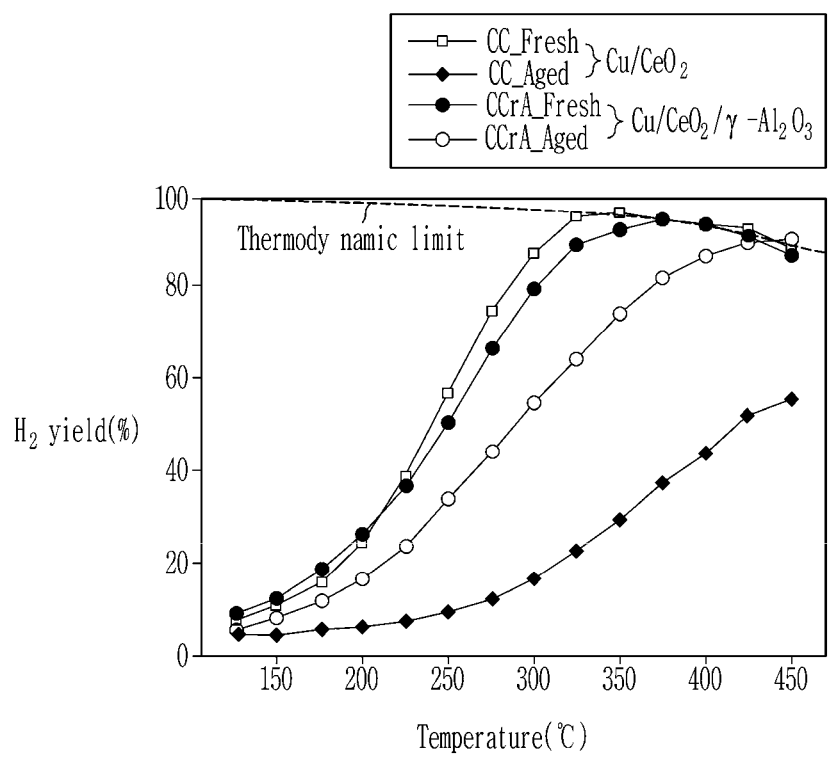
FIG. 8 illustrates a measured amount of hydrogen generated before and after hydrothermal aging for a $Cu/CeO_2$ catalyst and a second catalyst ($Cu/CeO_2/\gamma$-$Al_2O_3$) of the present disclosure.
Figure 9A:
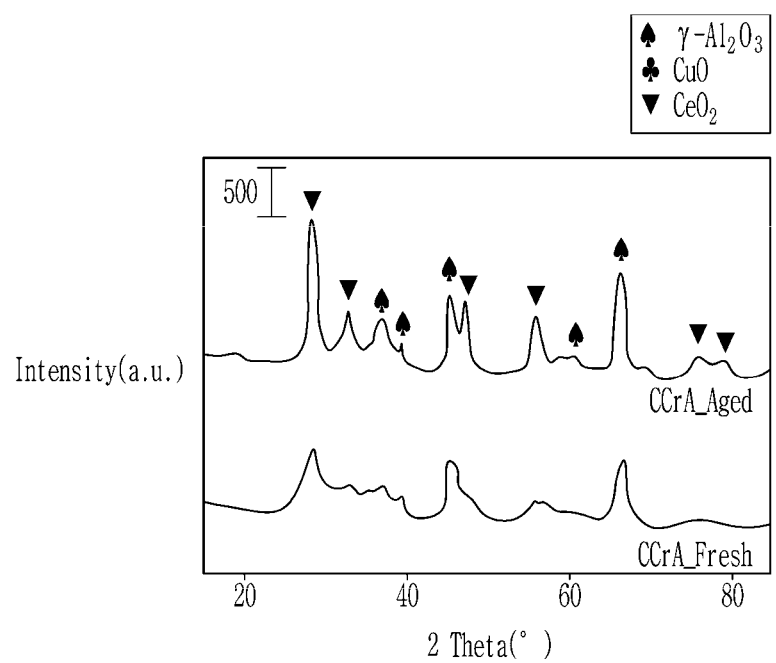
FIG. 9A and FIG. 9B illustrates X-ray diffraction patterns showing structural changes before and after hydrothermal aging for a $Cu/CeO_2$ catalyst and a second catalyst ($Cu/CeO_2/\gamma$-$Al_2O_3$) of the present disclosure.
Figure 9B:
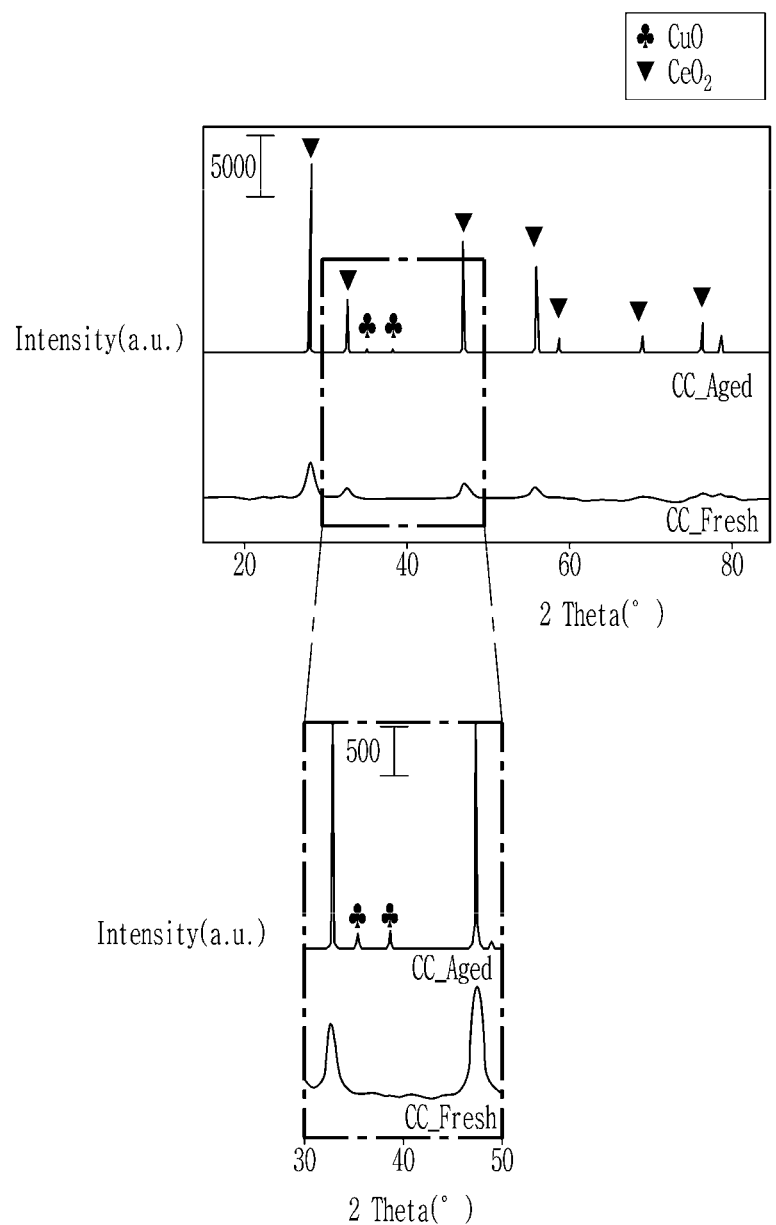

FIG. 8 illustrates a measured amount of hydrogen yield before and after hydrothermal aging for a $Cu/CeO_2$ catalyst and a second catalyst ($Cu/CeO_2/\gamma$-$Al_2O_3$) of the present disclosure, and FIG. 9A and FIG. 9B illustrate structural changes measured before and after hydrothermal aging for a $Cu/CeO_2$ catalyst and a second catalyst ($Cu/CeO_2/\gamma$-$Al_2O_3$) of the present disclosure.

Referring to FIG. 8, in the case of the second catalyst, it can be seen that a yield amount of $H_2$ does not significantly decrease even after hydrothermal aging. Since the $H_2$ gas is a reduction agent that is excellent in low temperature $NO_x$ reduction and is effective in improving low temperature performance, it can be predicted that the catalyst of the present embodiment including the second catalyst will have an excellent low temperature $NO_x$ purification rate.

Referring to FIG. 9A and FIG. 9B, in the case of $Cu/CeO_2$, it can be seen that Ce is lumped after the hydrothermal aging and thus CuO is formed. However, in the case of $Cu/CeO_2/\gamma$-$Al_2O_3$ which is the second catalyst, it can be seen that Ce is hardly lumped even after hydrothermal aging. In addition, it can be seen that the supported Cu is not lumped in a form of CuO. Through this, it can be expected that the catalyst of the present embodiment will have an excellent low-temperature $NO_x$ purification rate.

While the exemplary embodiments of the present disclosure have been described hereinbefore, it will be understood by those skilled in the art that various changes in form and details may be made thereto without departing from the technical spirit and essential features of the present disclosure.

Therefore, it is to be understood that the above-described exemplary embodiments are for illustrative purposes only, and the scope of the present disclosure is not limited thereto. The scope of the present disclosure is determined not by the above description, but by the following claims, and all changes or modifications from the spirit, scope, and equivalents of claims should be construed as being included in the scope of the present disclosure.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A catalyst for removing nitrogen oxides, comprising:
    a first support supported by a first catalyst including Pt, Ba, and Ce; and
    a second support supported by a second catalyst including Cu and Ce and being physically mixed with the first catalyst,
    wherein a mixing weight ratio of the first catalyst and the second catalyst is in a range of 1:3 to 3:1.

2. The catalyst for removing the nitrogen oxides of claim 1, wherein the first support and the second support comprise reduced alumina supports.

3. The catalyst for removing the nitrogen oxides of claim 2, wherein the reduced alumina supports comprise $\gamma$-$Al_2O_3$.

4. The catalyst for removing the nitrogen oxides of claim 1, wherein a content of Cu is 1 wt % to 8 wt % with respect to 100 wt % of the second support.

5. The catalyst for removing the nitrogen oxides of claim 1, wherein
    a content of a compound including Ce added to the second catalyst is 15 wt % to 30 wt % with respect to 100 wt % of the second support.

6. The catalyst for removing the nitrogen oxides of claim 1, wherein
    a content of Pt is 0.1 wt % to 5 wt % with respect to 100 wt % of the first support.

7. The catalyst for removing the nitrogen oxides of claim 1, wherein
    a content of Ba is 5 wt % to 15 wt % with respect to 100 wt % of the first support.

8. The catalyst for removing the nitrogen oxides of claim 1, wherein
    a content of a compound including Ce added to the first catalyst is 15 wt % to 30 wt % with respect to 100 wt % of the first support.

* * * * *